Nov. 22, 1938.   C. P. CIRAC ET AL   2,137,643
OVERRUNNING CLUTCH
Filed April 3, 1937
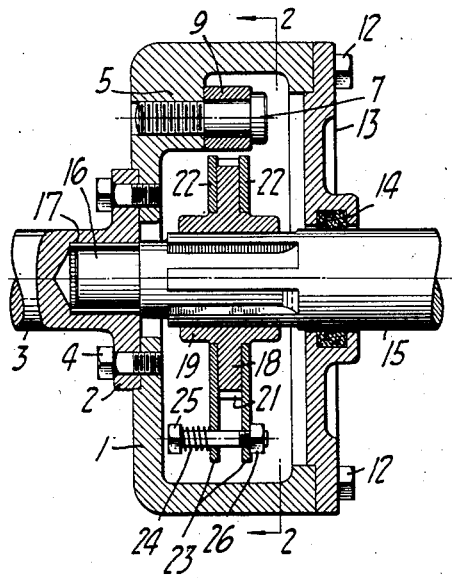
FIG_1_
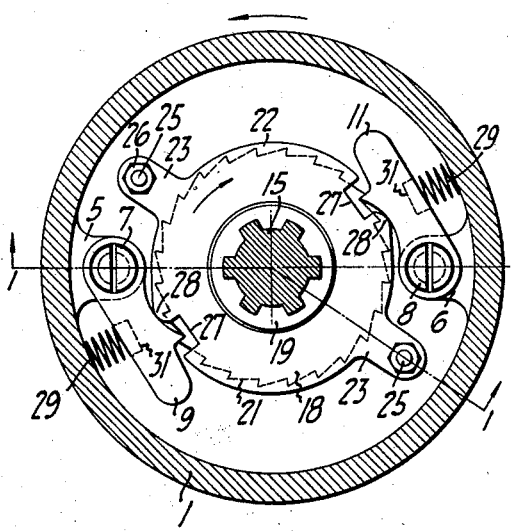
FIG_2_
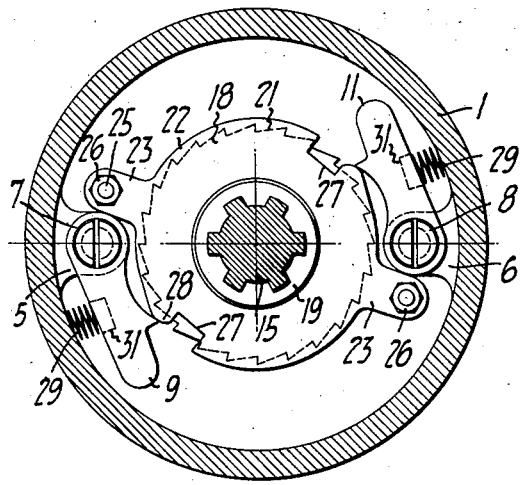
FIG_3_
INVENTORS
CHARLES P. CIRAC
THOMAS W. COOPER
WILLIAM W. MACDONALD
BY
ATTORNEY.

Patented Nov. 22, 1938

2,137,643

UNITED STATES PATENT OFFICE 2,137,643

OVERRUNNING CLUTCH

Charles P. Cirac and Thomas W. Cooper, San Francisco, and William W. MacDonald, Mountain View, Calif., assignors, by direct and mesne assignments, to Cirac Automatic Reverse Control Company, San Francisco, Calif., a corporation of California Application April 3, 1937, Serial No. 134,880

4 Claims. (Cl. 74—576)

This application relates to an over-running clutch and is a continuation in part of our application Serial No. 101,064 filed September 16, 1935 and entitled "Reverse lock mechanism".

Our earlier application discloses a shaft lock wherein a ratchet wheel associated with a shaft is made to cooperate with a pair of pawls pivoted to some fixed part of the frame of an automobile. The pawls are adapted to be positively held out of engagement with the teeth of the ratchet wheel under certain operating conditions by cam plates held in frictional engagement with the ratchet wheel. This same principle of holding the pawls out of engagement with the teeth of the ratchet wheel may be utilized in connection with an over-running clutch.

In general, therefore, it is the object of our invention to provide an over-running clutch of the type wherein the clutching action is obtained by the coaction of a ratchet wheel and pawls characterized in that a cam plate is held in frictional engagement with the ratchet wheel and is provided with cam surfaces for positively holding the pawls out of engagement with the ratchet wheel when the ratchet wheel is traveling faster than the driver to which the pawls are pivoted.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

In the accompanying drawing:

Figure 1 is a vertical section of an overrunning clutch embodying the objects of our invention and taken on the line 1—1 of Figure 2.

Figure 2 is a vertical section taken on the line 2—2 of Figure 1 and showing the pawls in engagement with the teeth of the ratchet wheel.

Figure 3 is a section similar to that shown in Figure 2 but showing the pawls held out of engagement with the teeth of the ratchet wheel by the cam plates.

As shown in the drawing, the objects of our invention are embodied in an over-running clutch wherein a base member or housing 1 is secured to the flange 2 of a shaft or driver 3 by means of screws 4. The housing 1 may therefore be considered as an integral part of the shaft or driver 3. Disposed within the housing 1 are a pair of diametrically opposed bosses 5 and 6 and pivotally secured to these bosses by screws 7 and 8 are a pair of pawls 9 and 11. Secured to the open end of the housing 1 by means of screws 12 is a cover plate 13 provided with a central stuffing box 14.

Extending through the stuffing box 14 is a shaft or driven member 15 whose reduced inner end 16 is accommodated and journaled in a recess 17 formed in the shaft or driver 3. Splined to the driven member 15 is a ratchet wheel 18 having a hub 19 and teeth 21 adapted to be engaged by the pawls 9 and 11.

Disposed over each face of the ratchet wheel 18 is an annular cam plate or ring 22 provided with outwardly extending lugs 23 adapted to engage the pivoted ends of the pawls 9 and 11. Frictional engagement between the contacting faces of the cam rings 22 and the ratchet wheel 18 is obtained by springs 24 carried on bolts 25 extending through the lugs 23. The tension of the springs 24 may be adjusted by nuts 26 carried on the end of the bolts 25. As shown in Figures 2 and 3, each cam plate or ring 22 is provided with a pair of diametrically opposed cam surfaces consisting of recesses 27 extending below the level of the teeth 21 of the ratchet wheel 18 and shoulders or portions 28 extending above the level of the ratchet wheel. Springs 29 secured within recesses 31 formed in the pawls 9 serve to urge the pawls in engagement with the ratchet wheel.

The operation of the device as above described is as follows:

The rotation of the device is intended to be in a counterclockwise direction, and as shown in Figure 2, the pawl 9, due to the fact that it is in registration with the depressed portion 27 of the cam plates, is in engagement with the teeth 21 of the ratchet wheel and therefore rotation of the driver 3 will impart rotation to the driven member 15. If the speed of rotation of the driver decreases without an equivalent decrease in the speed of rotation of the driven member, the cam rings 22, due to their frictional engagement with the ratchet wheel, will rotate with the ratchet wheel until stopped by the engagement of the lugs 23 with the pivoted ends of the pawls 9 and 11, as shown in Figure 3. Due to the engagement of the pawls 9 and 11 with the outwardly extending shoulder 28 of the cam rings 22, the pawls will be positively moved radially and outwardly out of engagement with the teeth of the ratchet wheel. If the speed of rotation of the driven member falls below the speed of rotation of the driver, there will also of course be relative motion between the cam rings 22 and the pawls 9 and 11. This relative motion will enable the pawls 9 and 11 to enter the depressed portion 27 of the cam plates and thereby again engage the teeth of the ratchet wheel. By positively holding the pawls 9 and 11 out of engagement with the ratchet wheel, the cam rings 22 overcome the past objections to over-running clutches of the ratchet wheel and pawl type, in that chattering of the pawls against the teeth is prevented and the pawls will always engage the next tooth in line the instant that the speed of rotation of the driven member falls below the speed of rotation of the driver, without skipping several teeth, as has sometimes happened in the past.

Although the over-running clutch as above described has not been shown in the drawing associated with any specific piece of mechanism, it may be inserted in the transmission line of any machinery and is particularly suitable for use in connection with machinery where heavy fly wheels are resorted to, and in the automotive industry in connection with self-starters, fan belts, and super-chargers.

We claim:

1. An over-running clutch comprising: a driver; a driven member; a ratchet wheel associated with said driven member; a pawl pivoted to said driver; means for urging said pawl in engagement with said ratchet wheel; a cam plate in slidable frictional engagement only with said ratchet wheel; means for applying a predetermined pressure between said cam plate and said ratchet wheel; a cam surface on said cam plate having a portion extending above the level of said ratchet wheel adapted to hold said pawl out of engagement with said ratchet wheel when said driven member is rotating faster than said driver and a portion extending below the level of the teeth in said ratchet wheel adapted to permit said pawl to engage said teeth when said driver is rotating faster than said driven member; and means for limiting the travel of said cam plate relative to said driver.

2. An over-running clutch comprising: a driver; a driven member; a ratchet wheel associated with said driven member; a pawl pivoted to said driver; means for urging said pawl in engagement with said ratchet wheel; an annular cam ring in slidable frictional engagement only with said ratchet wheel; means for maintaining a predetermined pressure between said cam ring and said ratchet wheel; a cam surface on said cam ring having a portion extending above the level of said ratchet wheel adapted to hold said pawl out of engagement with said ratchet wheel when said driven member is rotating faster than said driver, and a portion extending below the level of the teeth in said ratchet wheel adapted to permit said pawl to engage said teeth when said driver is rotating faster than said driven member; and means for limiting the travel of said cam ring relative to said driver.

3. An over-running clutch comprising: a pair of independent co-axial shafts arranged for relative rotary motion with respect to each other; a ratchet wheel having a central hub secured to one of said shafts for rotation therewith; a pawl carried by the other of said shafts in registration with said ratchet wheel; means for urging said pawl in engagement with said ratchet wheel; a pair of friction plates journaled on said hub, one on each side of said ratchet wheel; means carried by said friction plates for maintaining them in predetermined, frictional engagement with said ratchet wheel; a cam surface on one of said friction plates having a portion extending above the level of said ratchet wheel adapted to hold said pawl out of engagement with said ratchet wheel when the ratchet wheel is rotating in one direction with respect to said pawl and a portion extending below the level of the teeth in said ratchet wheel adapted to permit said pawl to engage said teeth when said ratchet wheel is rotating in the opposite direction with respect to said pawl; and means for limiting the travel of said cam plates relative to said pawl.

4. An over-running clutch comprising: a pair of independent members arranged for relative rotary motion with respect to each other; a ratchet wheel having a central hub secured to one of said members; a pawl carried by the other of said members in registration with said ratchet wheel; means for urging said pawl in engagement with said ratchet wheel; a pair of friction plates journaled on said hub, one on each side of said ratchet wheel; means carried by said friction plates for maintaining them in predetermined frictional engagement with said ratchet wheel; a cam surface on one of said friction plates having a portion extending above the level of said ratchet wheel adapted to hold said pawl out of engagement with said ratchet wheel when said ratchet wheel is rotating in one direction with respect to said pawl, and an adjacent portion extending below the level of the teeth in said ratchet wheel adapted to permit said pawl to engage said teeth when said ratchet wheel is rotating in the opposite direction with respect to said pawl; and means for limiting the movement of said friction plates with respect to said pawl.

CHARLES P. CIRAC.
THOMAS W. COOPER.
WILLIAM W. MacDONALD.